US008799484B2

(12) United States Patent
Allen et al.

(10) Patent No.: US 8,799,484 B2
(45) Date of Patent: *Aug. 5, 2014

(54) METHODS AND SYSTEMS FOR FACILITATING TRANSFER OF SESSIONS BETWEEN USER DEVICES

(71) Applicant: Research in Motion Limited, Waterloo (CA)

(72) Inventors: Andrew Allen, Mundelein, IL (US); Youngae Kim, Mississauga (CA)

(73) Assignee: Blackberry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/728,540

(22) Filed: Dec. 27, 2012

(65) Prior Publication Data

US 2013/0117457 A1   May 9, 2013

Related U.S. Application Data

(63) Continuation of application No. 12/034,227, filed on Feb. 20, 2008, now Pat. No. 8,392,580.

(51) Int. Cl.
*G06F 15/16* (2006.01)
*H04L 29/08* (2006.01)
*H04M 3/58* (2006.01)
*H04L 29/06* (2006.01)

(52) U.S. Cl.
CPC ........ *H04L 29/08639* (2013.01); *H04L 67/143* (2013.01); *H04M 3/58* (2013.01); *H04L 65/1086* (2013.01); *H04L 65/1096* (2013.01); *H04L 67/148* (2013.01); *H04L 29/08603* (2013.01); *H04L 67/14* (2013.01)
USPC ............................ 709/227; 709/225; 709/226

(58) Field of Classification Search
USPC .......................................... 709/225, 226, 227
See application file for complete search history.

(56) References Cited

U.S. PATENT DOCUMENTS

| 6,700,902 | B1 | 3/2004 | Meyer |
| 7,583,963 | B2 * | 9/2009 | Tammi et al. .............. 455/435.1 |
| 7,784,030 | B2 | 8/2010 | Christfort et al. |

(Continued)

FOREIGN PATENT DOCUMENTS

| EP | 1322103 | 6/2003 |
| EP | 182488 A1 * | 8/2007 |

(Continued)

OTHER PUBLICATIONS

Canadian Office Action mailed Feb. 6, 2012, in corresponding Canadian patent application No. 2,654,538.

(Continued)

*Primary Examiner* — Glenford Madamba
(74) *Attorney, Agent, or Firm* — Novak Druce Connolly Bove + Quigg LLP

(57) ABSTRACT

Methods and systems for facilitating transfer of an active session from a first device to a second device associated with the same user. A network server is configured to enable the switching or swapping of an active session from one device to another device, where both devices are associated with a common user address. The switching or swapping is implemented with no or minimal effect on the active session or awareness of the remote party. The device switch may be performed in relation to any active session, including VoIP, video conferencing, or other media sessions.

20 Claims, 6 Drawing Sheets

(56) References Cited

U.S. PATENT DOCUMENTS

| | | |
|---|---|---|
| 2002/0141560 A1 | 10/2002 | Khayatan et al. |
| 2003/0217171 A1 | 11/2003 | Von Stuermer et al. |
| 2006/0018272 A1* | 1/2006 | Mutikainen et al. .......... 370/328 |
| 2006/0073843 A1 | 4/2006 | Aerrabotu et al. |
| 2006/0198437 A1 | 9/2006 | Kim |
| 2007/0002831 A1 | 1/2007 | Allen et al. |
| 2007/0153777 A1 | 7/2007 | Coulas et al. |
| 2008/0032695 A1* | 2/2008 | Zhu et al. .................... 455/442 |
| 2009/0017856 A1* | 1/2009 | Albertsson et al. .......... 455/518 |
| 2009/0221307 A1 | 9/2009 | Wolak et al. |

FOREIGN PATENT DOCUMENTS

| | | |
|---|---|---|
| EP | 1821488 A1 | 8/2007 |
| WO | 98/37698 | 8/1998 |
| WO | 98/43177 | 10/1998 |
| WO | 01/59706 | 8/2001 |
| WO | 2006/066632 | 6/2006 |

OTHER PUBLICATIONS

R. Sparks et al.; "Session Initiation Protocol Call-Transfer (draft-ietf0sipping-cc-transfer-03)", Sippping WG, Oct. 21, 2004.

"Converged IP Messaging Requirements", Draft Version 1.0—Sep. 27, 2007, Open Mobile Alliance.

"Converged IP Messaging Architecture", Draft Version 1.0—Sep. 21, 2007, Open Mobile Alliance.

EESR dated Aug. 13, 2008 for corresponding EP Application No. 08151706.2 (now registration No. 2093968).

Office Action dated Oct. 26, 2011 for corresponding Chinese Application No. 200910130785.3.

2nd Office Action dated Jul. 12, 2012 for corresponding Chinese Application No. 200910130785.3.

* cited by examiner

METHODS AND SYSTEMS FOR FACILITATING TRANSFER OF SESSIONS BETWEEN USER DEVICES

CROSS-REFERENCE TO RELATED APPLICATIONS

This application is a continuation application of U.S. patent application Ser. No. 12/034,227, filed Feb. 20, 2008, the contents of which are hereby incorporated by reference.

RESERVATION OF COPYRIGHT

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

FIELD OF THE APPLICATION

The present application relates, in general, to media sessions and, in particular, to methods and systems for transferring an existing active session from a first device to a second device associated with the same end user.

BACKGROUND

It has become relatively common for individuals to possess a number of different devices through which they communicate. For example, a person may have a home telephone, a wireless telephone, a pager, a personal digital assistant (PDA), and an office telephone to name a few. As the population becomes increasingly mobile, making contact with a person through one of these communication devices has become more difficult.

In the context of telephony, cell forwarding is one method of addressing this problem. Certain telephone systems allow users to enter another number to which a call is forwarded if not answered by a specified number of rings. This should allow an individual with multiple telephone devices to forward the call to such devices until the telephone at which the individual is located finally rings. However, if several telephones are involved, this approach becomes complicated. Moreover, it requires the calling party to remain on the line for a significant period of time if the call is to be forwarded multiple times. Furthermore, it is necessary that call forwarding capabilities exist on each of the individual's telephones. In addition, this approach requires that all telephones involved be reprogrammed each time an individual desires to initiate call forwarding.

At times, a user engaged in an active media session with a remote party may wish to move the session to one of his or her other devices. For example, if the user is participating in a Voice-over-IP (VoIP) session with a remote party using a mobile device, he or she may wish to move the session to an office or home telephone to preserve battery power in the mobile device. In another example, if the user is engaged in a multi-media session with a remote party, such as a video conference, he or she may wish to move the session from a fixed device, like a desktop personal computer, to a mobile device so as to enable the user to move while maintaining the session. One mechanism is to terminate the previous session and re-establish a new session over the new device, but that would be highly disruptive.

DETAILED DESCRIPTION OF THE INVENTION

Figure 1:
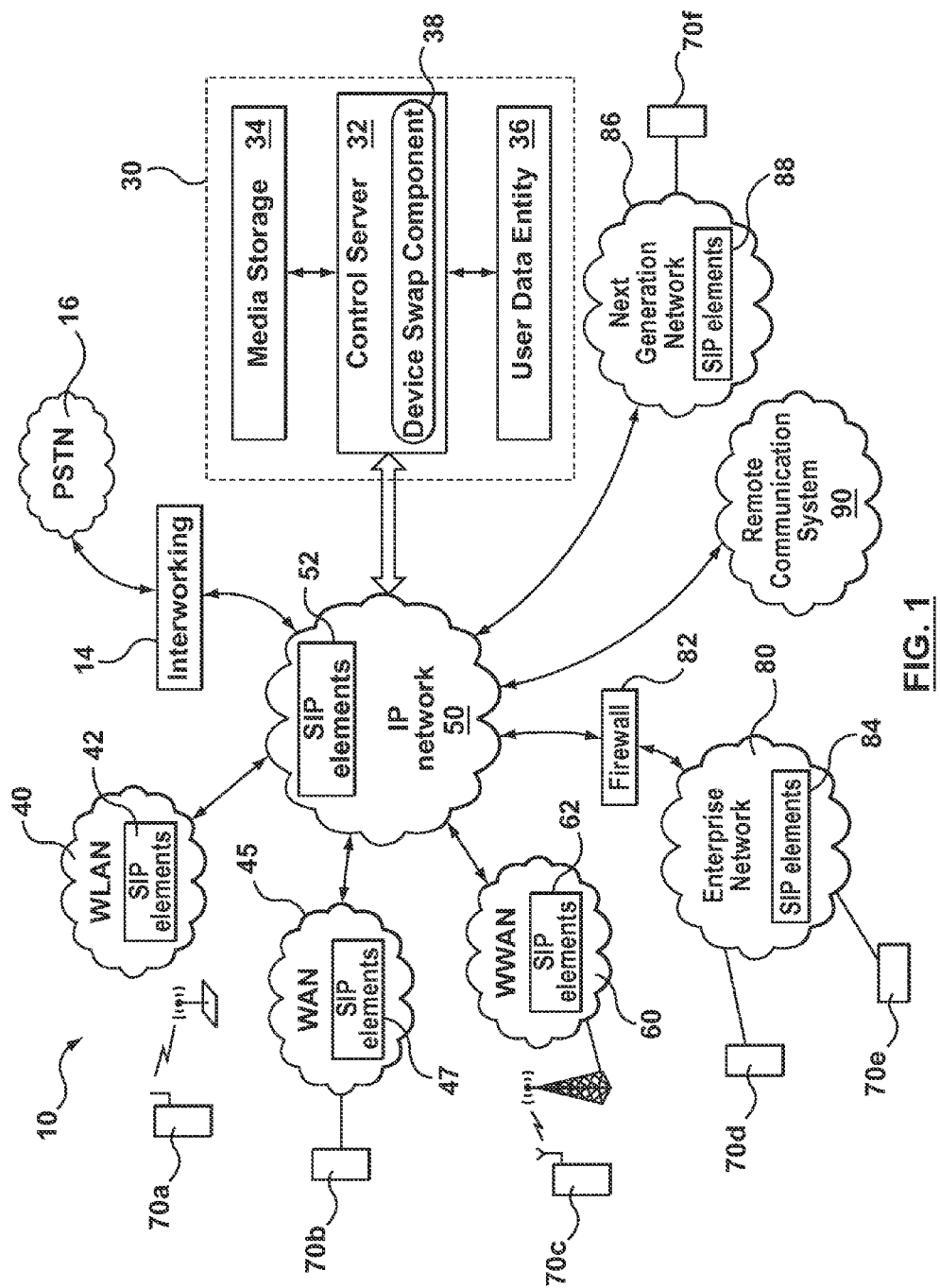
FIG. 1 diagrammatically illustrates an example communications system.

Example embodiments and applications will now be described. It should be appreciated that other embodiments may be realized and structural or logical changes may be made.

Embodiments disclosed herein relate to a telecommunication messaging system that can selectively perform messaging functions or session-based functions with one or more of a plurality of IP-based messaging devices associated with a particular user. Each of the plurality of IP-based messaging devices has a unique address. The plurality of IP-based messaging devices may also have a common address. In order words, a user may have one address or number which is associated with all the user's devices, and each device may have a unique address which identifies the specific device. Addressing of the devices may include one or more address types, such as SIP URI, SIPS URI, TEL URI (telephone number), GRUU (Globally Routable User Agent URI), or private numbering plan (PNP) (e.g., extension dialing) addressing, etc.

A first example embodiment is discussed and illustrated with reference to its implementation within an SIP-capable IP network. In such an environment, a user may be associated with multiple devices. For example, the user may have a dual-mode mobile device, a desktop office telephone, a home personal computer, a WLAN-enabled office laptop computer, or other such devices. Each device may be configured for IP-based communication, whether for messaging, session-based communications, or both. In the first example embodiment, the SIP-capable IP network is configured to enable converged seamless messaging and session functionality and interoperability over multiple devices.

In embodiments described below, a server is configured to enable the switching or swapping of, or is otherwise requested to switch or swap, an active session from one device to another device, where both devices are associated with a common user address and each device has its own address which identifies the specific device. A server has a mapping table or other stored association that contains the association between the common user address and the user's device addresses. The switching or swapping is implemented with no or minimal effect on the active session or awareness of the remote party. The device switch may be performed in relation to any active communication session, including VoIP, video conferencing, messaging session, Push-to-Talk over cellular (PoC) session, etc., and is generally initiated by the user of the devices.

In some embodiments, session history information is stored in the server and, when a device is swapped, the session history information can be sent to and displayed on the new device upon a user's request. Subject to user preferences or service provider policies, all or a portion of the session history information may be transferred to the new device and, in some embodiments, displayed on the new device.

In one aspect, the present application discloses a method of facilitating transfer of an existing session from a first user device to a second user device, wherein the existing session is established between the first user device and a remote party and wherein the existing session includes a first leg between the first user device and a server and a second leg between the server and the remote party. The server stores an association between a user address and both the first user device and the second user device. The method includes receiving, at the second user device, a device switch message from the first user device, wherein the device switch message includes information identifying the existing session; sending from the second user device to the server a session invitation message containing a reference to the existing session with an instruction to replace the first user device; verifying from the stored association that the second user device is associated with the user address; accepting the session invitation message from the second user device to establish a new session; joining the new session with the second leg of the existing session to enable the exchange of media between the second user device and the remote party; and terminating the first leg of the existing session.

In another aspect, the present application discloses a server for facilitating transfer of an existing session from a first user device to a second user device, wherein the existing session is established between the first user device and a remote party and wherein the existing session includes a first leg between the first user device and the server and a second leg between the server and the remote party. The first user device is configured to send a device switch message to the second user device. The device switch message includes information identifying the existing session. The server includes an IP communications interface for sending and receiving IP-based communications over a network, a user data entity containing user information including an association between a user address and both the first user device and the second user device, and a control subsystem for controlling sessions. The control subsystem includes a device swap component configured to receive from the second user device a session invitation message containing a reference to the existing session with an instruction to replace the first user device, verify from the stored association that the second user device is associated with the user address, accept the session invitation message from the second user device to establish a new session, join the new session with the second leg of the existing session to enable the exchange of media between the second user device and the remote party, and terminate the first leg of the existing session.

In yet another aspect, the present application discloses a method of facilitating transfer of an existing session from a first user device to a second user device, wherein the existing session is established between the first user device and a remote party and wherein the existing session includes a first leg between the first user device and a server and a second leg between the server and the remote party. The server stores an association between a user address and both the first user device and the second user device. The method includes receiving, at the server, a device switch message from the second user device; determining from the stored association that the second user device is associated with the user address; identifying the existing session based on the association between the first user device and the user address; establishing a new session with the second user device; joining the new session with the second leg of the existing session to enable the exchange of media between the second user device and the remote party; and terminating the first leg of the existing session.

In yet a further aspect, the present application discloses a server for facilitating transfer of an existing session from a first user device to a second user device, wherein the existing session is established between the first user device and a remote party and wherein the existing session includes a first leg between the first user device and the server and a second leg between the server and the remote party. The server includes an IP communications interface for sending and receiving IP-based communications over a network; a user data entity containing user information including an association between a user address and both the first user device and the second user device; and a control subsystem for controlling sessions. The control subsystem including a device swap component configured to receive from the second user device a device switch message, determine from the stored association that the second user device is associated with the user address, identify the existing session based upon the association between the first user device and the user address, establish a new session with the second user device, join the new session with the second leg of the existing session to enable the exchange of media between the second user device and the remote party, and terminate the first leg of the existing session.

The embodiments disclosed herein are not to be limited to any particular environment.

Reference is first made to FIG. 1, which diagrammatically shows a communication system 10. As will be discussed below, the system 10 provides for a full integration of local and remote IP-based communication devices, such as communication devices 70 (shown individually as 70*a*, . . . , 70*f*). In this example, the communication devices 70 include any device capable of IP-based communications. In one embodiment, the device 70*a* may be a mobile device configured to connect with a wireless local area network (WLAN) 40 through an access point using, for example, any one of the IEEE 802.11 suite of communications protocols. In another embodiment, the device 70*b* may be a personal computer or computing device including a Ethernet card configured to connect to an wide area network (WAN) 45, for example via an internet service provider (ISP). In another embodiment, the device 70*c* may be a wireless mobile device configured to connect with a wireless wide area network (WWAN) 60 using any one or more of a number of radio protocols, such as GSM/GPRS/EDGE, UMTS, CDMA, WiMAX, etc. In yet other embodiments, an enterprise network 80 may include devices such as a digital desktop telephone set 70*d* and/or a personal workstation 70*e*. Device 70*f* may be an IP-enabled home phone, for example, or another device configured to operated within a Next Generation Network (NGN) 86, such as TISPAN NGN or HFC cable networks. Other communications devices 70 capable of IP-based messaging or session-based communications will be understood by those skilled in the art. It will be appreciated that combinations of these various embodiments (e.g., a home telephone, with business telephone and wireless mobile devices linked via IP to the same core network) are also possible.

Some of the devices 70 may be configured for messaging applications. Messaging applications may include text-based messaging, including SMS, E-mail, Instant Messaging (IM), etc., but may also include multi-media messaging, including images, video and/or audio. Some of the devices 70 may alternatively or additionally be configured for session-based communications. Session-based communications may include voice-over-IP (VoIP), but may also include chat, some IM services, Push-to-talk over Cellular (PoC), some webcasting, video conferencing, and other such multi-media services.

The devices 70 are SIP-compliant. In these embodiments, the devices 70 are capable of sending and receiving SIP message requests and responses to set up, tear down, and manage session-based communications. In other words, the compliant devices 70 are configured as SIP User Agents.

In the present example embodiment, a user is associated with two or more devices 70. For example, the user may be associated with devices 70*a*, 70*b*, 70*c*, 70*d*, 70*e*, and 70*f*. The system 10 may selectively establish communications with one of a plurality of the devices 70 associated with a particular user. The particular user has a unique user address that the user may publish or disseminate to third parties to enable the third parties to contact the user. In some examples, the user address may include a unique number, such as a telephone number, or a unique name. The association between the user and the devices 70 may be realizes as an association between the user address and the devices 70, specifically, a unique device identifier for each of the associated devices 70. In some embodiments, the device 70 to which the system 10 directs communications may be selected by the system 10 based on user preferences.

Each of the devices 70 is capable of communicating with an IP network 50. The IP network 50 may, for example, be a WAN, such as the Internet. The IP network 50 may be a local area network (LAN), a municipal area network (MAN), or a Public IP network (e.g. IP Multimedia Subsystem) in some embodiments. In some embodiments, the devices 70 may reach the IP network 50 via the WLAN 40, WAN 45, WWAN 60, enterprise network 80, NGN 86, and other networks.

In many embodiments, the IP network 50 and the WLAN 40, WAN 45, WWAN 60, enterprise network 80, and NGN 86, may contain SIP elements 52, 42, 47, 62, 84 and 88. SIP elements may include, for example, one or more SIP proxy servers for receiving and forwarding messaging to the devices 70, one or more SIP registrars, location servers, DNS servers, back-to-back user agents, or other such SIP elements. The various networks 50, 40, 45, 60, 80, 86 and SIP elements 52, 42, 47, 62, 84, 88, form a SIP/IP layer interconnecting the devices 70 and other user agents and servers. Alternatively, some or all of the SIP elements 52, 42, 47, 62, 84, 88, may be contained within the IP network 50 (e.g. IP Multimedia Subsystem) and the WLAN 40, WAN 45, WWAN 60, NGN 86 and enterprise network 80 provide IP access to the SIP-enabled IP network 50.

The system 10 includes a communication server 30. The communication server 30 is connected to the IP network 50 and provides converged seamless messaging and session functionality and interoperability over multiple devices. In particular, the communication server 30 includes a control server 32. The control server 32 provides the central logic and control for the communications server 30 and enforces both user preferences and service provider policies. The control server 32 participates in the control over the routing of messaging and the set-up, tear-down and management of sessions with the devices 70. The control server may also store a log of the sessions (session history) or some other network entity may store the session history. Functions of the control server 32 are described in greater detail below.

The communication server 30 also includes media storage 34. The media storage 34 is one or more databases containing stored media data relating to messaging or sessions. For example, the media storage 34 may include session history, messaging content, and metadata relating to content. The media storage 34 may apply privileges associated with a user or a resource. It may support synchronization operations in accordance with an applicable policy with regard to media stored on a client device 70. It may also enable user management of media content, including establishment of storage policies and the copying, deleting, uploading, downloading, managing of folders to store media content (e.g. creating, deleting, moving, modifying folders), or other operations with respect to media content.

The communication server 30 further includes user data entity 36. The user data entity 36 may store user data associated with the devices 70. For example, the user data may include associations between a user address and one or more of the devices 70. In many embodiments, a single user address is associated with multiple devices 70. For example, the single user address may be associated with a plurality of unique device addresses specific to the associated devices 70. This enables third parties to contact the user through a single user address without necessarily requiring knowledge of the specific device addresses. In some cases, the user need not have any knowledge of the specific device addresses and may only know his or her unique user address. Additional user-related data and functionality may be implemented in the user data entity 36, such as contact information, media preferences, and user configuration settings. It will be appreciated that the control server 32, media storage 34, and user data entity 36 may be implemented in a variety of ways. For example, they may be implemented on separate servers or together on one server.

The communication system 10 may be connected to legacy networks, such as for example PSTN 16, via an interworking entity 14. The interworking entity 14 provides translation services for converting messages and signaling between the legacy network and the communication system 10. For example, in one embodiment the interworking entity 14 is a PBX/IP-PBX connected to the PSTN 16 by primary rate interface (PRI) and to the IP network 50 by IP connection. In that example, voice media is converted from circuit-switched audio on the PSTN 16 side to voice-over-IP (VoIP) on the IP network 50 side by the interworking entity 14. In another embodiment the interworking entity 14 is an IP-SM-GW (IP Short Message Gateway) that is interworking between SIP-based messaging and SMS. Other interworking entities 14 may perform similar translations of IP-based session or messaging data protocols to legacy or proprietary data protocols. For another example, in one embodiment the interworking entity 14 is connected to the communication server 30.

The communication system 10 may be connected to one or more remote communication systems 90 having similar services and functionality. Messaging and sessions may cross multiple systems 10, 90 and the respective control servers 32 may be configured to ensure interoperability of the cross-system communications.

It will be appreciated that the devices 70 are each configured to communicate with the communication server 30 using, for example, SIP compliant messaging. Details of one or more example devices are given below. In general, each device 70 includes a user interface, a processor, memory, and a "client" application for communicating with the communication server 30. The devices 70 may further include messaging applications, multimedia applications, and other applications configured to compose, receive, present, or send messages or sessions with remote users. Example applications may include e-mail applications, instant messaging applications, text messaging applications, video conferencing applications, Push-to-Talk over cellular (PoC), and others.

Initially, the devices 70 each register with a SIP registrar, which may be one of the SIP elements 52 in IP network 50. The devices 70 may directly contact the server 30 to indicate that they are registered. Alternatively the server 30 obtains information about the registration of devices 70 indirectly from the IP network 50 using the third party registration mechanism as defined in 3GPP TS 24.229 and/or the registration event package as defined in RFC 3680. The registration may be performed automatically, e.g. every time the device 70 is powered on or on a periodic basis, or it may occur manually on user selection. In another embodiment, the registration may be performed in response to a request from the server 30, for example if the device 70 is required by the network to re-authenticate. The device 70 may contact the server 30 using a SIP-based message in some embodiments. In response, the server 30 sends a response data signal rejecting, failing or accepting the request. Once registered, the device 70 and server 30 may request information each other using data signals/messages.

As noted above, each user has at least one unique user address. The user address is a single unified contact address for reaching a user on any of his or her devices. In some embodiments, a user address may include a TEL URI (telephone number), SIP URI, SIPS URI, e-mail address, PNP telephone number, GRUU, or other addressing scheme. Irrespective of the format of the address, each user has two or more devices 70 associated with their user address. In this example embodiment an example user has five associated devices 70a-70e. This association is stored as user preference data in the SIP elements 52 or user data entity 36 of the communication server 30. In particular, in some embodiments, the association is stored as an association between the unique user address and the specific device addresses of each of the associated devices 70a-70e. Accordingly, when the SIP elements 52 or server 30 receive messages or session data addressed to the user address, it is capable of identifying the device(s) 70 and/or device addresses to which the messages or session data may be relayed. The user preference data may specify logic rules or other criteria for determining to which device(s) 70 messages or session data should be sent. In some embodiments, the server 30 may receive presence information from an external source of presence information. The delivery of messages or session data to the device(s) 70 may be wholly or partly based on this presence information. It may also depend on the nature of the messages or session data and the corresponding capabilities of the device(s) 70, as specified for example in predefined logic rules.

When an incoming message is received by the server 30 addressed to a user address, the server 30 may deliver the message or a message notification to one or more of the device(s) 70 based on the message characteristics (e.g. the type of media), the device capabilities, user preferences set in the user data entity 36, and/or presence information. For example, the user preferences for a given user may specify to which of the devices 70a-70f messages or message notifications should be delivered and/or when they should be delivered and when they should be queued for later delivery. By way of another example, the server 30 may deliver a message to a device 70, such as wireless device 70a, containing video only if the device characteristics associated with wireless device 70a indicate sufficient processing speed and display resolution for a reasonable quality of service experience. It will be appreciated that many other factors may be taken into account in determining to which devices(s) 70 messages or message notifications are to be delivered.

The server 30 may also be configured to deliver an incoming session request addressed to the user address to one or more of the device(s) 70. As with messages, the determination of which device(s) 70 are to receive the session invitation may be partly based on user preferences, device capabilities, nature of the media specified in the session request, service provider policy, presence, and other factors.

In one example, a session invitation is sent by a remote party to the server 30 addressed to the user address. The server 30 determines to which device(s) 70 the invitation ought to be directed. It then generates and sends a new session invitation to the identified device(s) 70, such as a SIP INVITE message. The invitation may contain data regarding the remote party. The invitation may be sent simultaneously to more than one of the devices 70, or it may be sent sequentially to more than one of the devices 70 if it goes unanswered at a first one of the devices 70.

On receipt of the invitation, the device(s) 70 alerts the user to the incoming request, for example by audible, visual and/or vibratory indicators, and offers the user the opportunity to accept or reject the proposed session. If the user accepts the session, then the device 70 responds with an acceptance message to the remote party via the server 30, such as a SIP 200 OK message. After the exchange of ACK messages, the session will be initiated over a first leg from the device 70 to the server 30 and a second leg from the server 30 to the remote party. It will be appreciated that the second leg may comprise a number of legs depending on the network architecture between the server 30 and the remote party. The server 30 substantially seamlessly connects the two legs to enable the exchange of media between the device 70 and the remote party.

In another example, a session may be initiated by the user from one of the devices 70. Based on a user request input through a user interface, perhaps using a session-based application program like a video conferencing application, the device 70 generates and sends a session invitation addressed to a remote party. The session invitation is sent to the server 30. The server 30 may assess whether the invitation request conforms to predetermined criteria, including user policies, service provider policies, or other such criteria. If acceptable, then the server 30 sends an invitation request to the remote party. If the session invitation is accepted by the remote party, the server 30 and device 70 complete set-up of the session between the device 70 and the server 30 and the server 30 completes set-up of the session between the server 30 and the remote party. The two legs of the session are substantially seamlessly connected by the server 30 to facilitate conduct of the session application between the device 70 and the remote party.

In these examples, the remote party may be a user/device within the system 10, within a remote communications system 90, or, in some instances, a legacy system like the PSTN 16.

Because the server 30 is involved in routing messages and establishing sessions on behalf of the devices 70, it is capable of providing additional session functionality during an active session. For example, during the progress of an active session, the server 30 permits the device 70 to add or modify media within the session, add additional sessions (e.g. dialogs), etc. Using SIP signaling, the device 70 can send requests to the server 30 and the server 30 can initiate additional sessions, modify existing sessions, and otherwise manage the ongoing sessions.

The sessions may support any number of session-based applications, including VoIP, messaging, Push to Talk (PoC), etc. With respect to VoIP, video-conferencing, or other telephony-type services, the server 30 may support telephony-type functions or operations such as voicemail, universal voice mail notification, answer acknowledgement, extension dialing, session hold and retrieval, DTMF tones, caller ID, callback, call forwarding, call transfer, call waiting, mute, call blocking, call redial, call parking, speed dial, do not disturb (DND), DND bypass list, and DND list, among others.

In accordance with an embodiment, the user data entity 36 of server 30 may specify numerous system-defined user access rights and user modifiable preferences, which can alter the session handling described herein. Referring back to FIG. 1, a system administrator may set user access rights and priorities. The user may use any IP-enabled device capable of accessing the IP network 50 to set numerous user preferences. For example, the user may employ a Web-based or graphical user interface, e.g. a web browser application on a personal computer or mobile device, to access and set user preferences, alternatively XCAP may be used or SIP mechanisms such as SIP Publish or other SIP Methods.

It will be appreciated that the system 10 provides one user address for each user, which has several advantages. The single address may be, for example, the user's physical office extension DID telephone number (TEL URL), the user's SIP URI, SIPS URI, the user's e-mail address, GRUU, or any other such address. This user address will not have to be changed even when the user changes his devices 70. In fact, if a system administrator or other personnel provides the user with a new device (and the number/address of the device is associated with the user address in the server 30), the user may never need to know the actual device address of the new device. The user only needs to remember the user address regardless of which device he/she is using.

In some instances, the system 10 may use a Globally Routed User Agent URI (GRUU) to uniquely identify each device 70 despite the fact that each of a user's devices 70 share a common user address. In the context of SIP, GRUUs are described in J. Rosenberg, "Obtaining and Using Globally Routable User Agent (UA) URIs (GRUU) in the Session Initiation Protocol (SIP)", Internet Engineering Task Force, Jun. 25, 2007 (hereinafter referred to as Rosenberg and hereby incorporated by reference in its entirety). A public GRUU is constructed by adding a "gr" URI parameter to the normal address of record (AOR) or user address. For example, a public GRUU may be: sip:bob@company.com; gr=kdf234rh48fj. A temporary GRUU may be constructed using algorithm in the registrar, and may take the form: sip: lkjwe23423kl324j234j332@company.com;gr. Each device obtains its GRUU from a SIP registrar in the system. In some embodiments, the SIP registrar may be implemented within the SIP elements 52. The user preference information in the user data entity 36 that associates the devices 70 with the user address may include GRUU information.

Another published IETF standard, Rosenberg, J., "A Session Initiation Protocol (SIP) Event Package for Registrations", RFC 3680, March 2004, details mechanisms by which a "watcher" can obtain information from a SIP registrar, including registered contact information. Draft guidelines have been published to detail an extension to the registration event package for obtaining GRUU information from a SIP registrar: Kyzivat, P., "Registration Event Package Extension for Session Initiation Protocol (SIP) Globally Routable User Agent URIs (GRUUs)", Internet Engineering Task Force, Jul. 6, 2007 (hereinafter referred to as Kyzivat and hereby incorporated by reference in its entirety). Together, these documents define SIP protocols for obtaining GRUU information from SIP registrars for an address of record. Accordingly, the server 30 may be configured to use these SIP registration event protocols to obtain GRUU information from SIP registrars within the system 10 regarding the devices 70 associated with a user address. In this manner, the server 30, and in particular the user data entity 36, may obtain up-to-date contact information, including GRUUs, for each of the devices 70 registered with the system 10 and associated with the user address.

The server 30 obtains the GRUUs for each device 70 using the mechanism in "Registration Event Package Extension for Session Initiation Protocol (SIP) Globally Routable User Agent URIs (GRUUs)". The user preferences contain the GRUU or GRUUs to which requests that meet particular criteria should be routed. The Public GRUU contains the user address as well as an identifier in the gr parameter that uniquely identifies the specific device instance.

The user or system 10 can publish this single user address (as opposed to the multiple numbers/addresses associated with the many devices the user can associate with his/her account), for example, in business cards, user profile on a website, telephone directories, etc. In the case of telephony-based sessions, this user address can be placed into the ANI/ DNIS information of placed calls, which helps mask the physical telephone number of the device 70 from the other party on the call. More generically, the user address may be reflected in the SIP header information of SIP messages sent from the server 30 to remote parties, thereby masking the contact details of the device(s) 70 participating in the session. This also means that people or organizations attempting to contact the user only require the single user address, which is particularly advantageous.

For dual mode devices, there is often a telephone or contact number associated with the cellular mode of the device and a separate, different address or contact number associated with the data/WiFi mode of the device. When the user is registered with the server 30 the user does not need to know either number. In operation, the server 30 may use the cellular and WiFi modes of the device as two separate interfaces for establishing sessions.

As mentioned above, sometimes it is desirable for user engaged in an active session using a first device (e.g., mobile device 70c, etc.) to switch the session or a portion of the session to a different device (e.g., mobile device 70a, personal workstation 70e, etc.). In these situations, it is desirable to make the switch without dropping the active session and without letting the other party to the session know that the switching has taken place. Some call transfer mechanisms in the telephony environment require that the remote party be put on hold for the duration of the transfer operation. This makes the call transfer apparent to the other party and can leave them in a hold state for an unacceptably long period of time.

Referring still to FIG. 1, the control server 32 includes a device swap component 38. The device swap component 38 includes one or more software elements that provide the functionality to facilitate a device swap during an active session. Although the device swap component 38 is depicted in FIG. 1 as a separate module or application, it will be appreciated that it may form a part of another software module, application, interface, etc., and may be implemented using any suitable computer program language. The functional operation of the control server 32, or more broadly the server 30, as configured by various embodiments of the device swap component 38 are illustrated below.

Figure 2A:
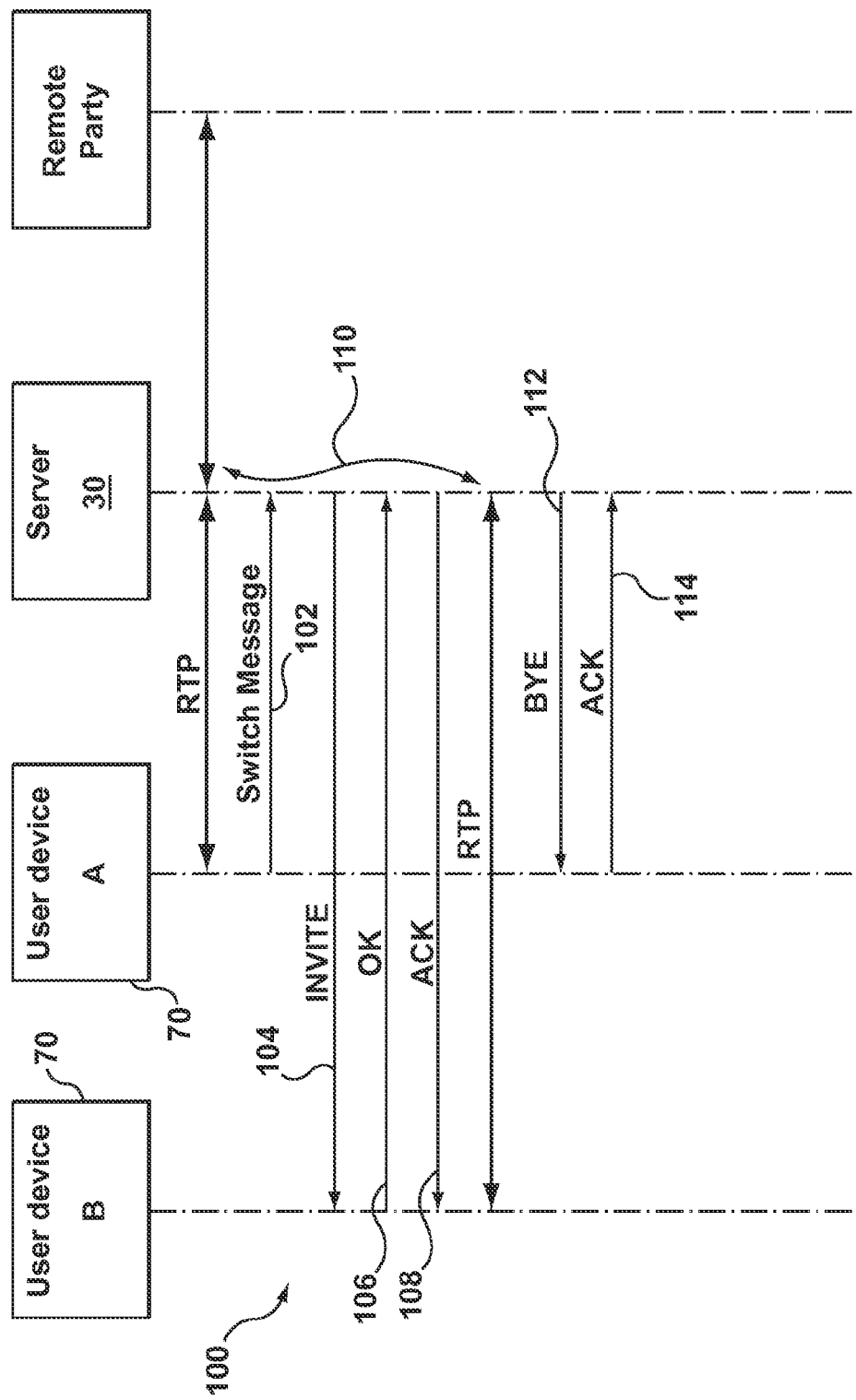
FIG. 2A shows an example flow diagram for executing a device switch during an active session.

FIG. 2A illustrates a first scenario 100 in which a user of "device A" is participating in a session with a remote party. Session data is carried over a first media leg, such as using RTP or MSRP, between user device "A" and the server 30, and over a second media leg between the server 30 and the remote party. The second media leg may be wholly or partly RTP or MSRP, although in some embodiments the remote party may be located within a legacy network and the session data may pass through interworking entities 14.

In this scenario 100, the user of device A decides that a switch to "device B," another device associated with the user, is required. The reason for the switch is irrelevant, but may include the detection of a low battery condition, signal degradation, poor quality of service, change in location and the like. In the illustrated embodiment, devices A and B are devices 70 associated with the same user and user address registered with the server 30. The server 30 may employ GRUU or other addressing techniques to address the device switch message or signal between the two devices 70.

In the illustrated example, at some point during the session, the user determines that a switch to device B is required. That is, the user or the device 70 identifies a condition whereby it would be beneficial to switch to another device. The user transmits a device switch request message 102 to the server 30 to initiate a device switch. The device switch request message 102 may take any number of forms. In some embodiments it may be a SIP PUBLISH or SIP MESSAGE message within the dialog initially established for the session. It may be a custom SIP message, perhaps using the INVITE format with a feature indicator signifying a device swap instruction. In one embodiment it may be a SIP REFER message containing a reference to device "B". For example, the SIP REFER message may contain the GRUU of device "B" in the refer-to header of the SIP REFER message. Other SIP messages or non-SIP messages may also be employed provided the server 30 is capable of identifying the switch message as an instruction to contact a particular one of the devices 70 associated with the user of device "A".

By virtue of the user information stored in the server 30, including the associations between the user address and each of the user's devices 70, or at least their addresses, the server 30 may have sufficient information to contact device "B". The server 30 may determine if the user has rights to initiate a device switch and/or if user preferences impose conditions on use to allow/prohibit particular users from requesting a device switch. For purposes of the illustrated example, it is presumed that the switch is permissible. In one example, if the server 30 receives a SIP REFER message containing the GRUU of device "B" in the refer-to header, the server 30 may consult the stored user information to confirm that the GRUU corresponds to a device associated with the same user as is associated with device "A". As noted above, the server 30 may obtain the GRUUs for devices 70 associated with a given user by employing the registration event package mechanism described by Kyzivat. The GRUU information, together with the stored associations between a user address and devices 70, permit the server 30 to confirm that a SIP REFER message relates to a device swap by the user. Similarly, the devices 70 may obtain the GRUUs of other devices 70 associated with the same user by employing the registration event package mechanism described by Kyzivat.

The user of device "A" can initiate the device switch by pressing one or a series of keys on the device "A" keypad, touchscreen, selecting a menu option, etc., in accordance with a predefined manner associated with requesting a device switch. The instructions for initiating the device switch should be previously communicated to and generally available for the user (e.g., user manual, enterprise frequently asked questions (FAQ) menu, etc.). Alternatively the device may automatically initiate the device switch based on some pre set preconditions (e.g., low battery conditions, poor signal strength or quality of service, etc.).

The server 30 may retrieve the device "B" contact information associated with the user address in stored user information and/or it may receive the contact information, such as GRUU, in the device switch request message 102. In one embodiment, the server 30 may be configured by default to retrieve the contact information of a particular user device 70 during device switch scenarios. In any embodiment, the device "B" may be another remote device, an office telephone, home telephone or other wired/wireless device. In the illustrated example scenario 100, the server 30 initiates a new session with device "B" using the device's contact information, such as its SIP URI, SIPS URI, GRUU, TEL URI (telephone number), etc. For example, the server 30 may send a SIP INVITE message 104 to the contact address for device "B".

Receipt of the session invitation causes an audible (e.g., ring tone), vibrational and/or visual alert at device "B". Once the user of device "B" accepts the session from the server 30 device "B" sends a 200 OK message 106, and the server 30 then responds with an ACK message 108, the session is established between device B and the server 30 and RTP-based and/or MSRP-based media may be sent between the device "B" and the server 30. The server 30 then "joins" 110 the session established with the remote party to the session established with device "B". In other words, media data received from the remote party is sent to device "B" within the newly established dialog and media data from the device "B" is sent from the server 30 to the remote party within the existing older dialog between server 30 and the remote party.

The device switch may be attended or unattended. In an attended device switch, the dialog with device "A" may be put on hold and device "A" may receive one or more NOTIFY messages regarding the status of the referral. Eventually, once the session with device "B" has been confirmed, device "A" may send a SIP BYE message to terminate its participation in the session. In an unattended device switch, the dialog with device "A" may be terminated by the device shortly after making the referral without confirmation that the device swap was successful. This latter approach may lead to problems if there are glitches in the transfer.

In another embodiment, and as illustrated in FIG. 2A, the server 30 may facilitate the device swap by maintaining the dialog with device "A" in an active mode, thereby ensuring that media packets for the session continue to be exchanged between device "A" and the remote party while the server 30 attempts to set up a new dialog with device "B". In other words, the dialog with device "A" is not put "on hold", making the transition substantially seamless from the point-of-view of the remote party. Once the session with device "B" is established, the server 30 may reroute media data from the remote party to device "B" substantially seamlessly, such that the remote party is unaware of the device swap. The server 30 may then manage the closing of the session with device "A" by sending a SIP BYE message 112 and receiving a responding ACK message 114. The device swap is then complete.

When the device "B" is swapped in for device "A" and the new session with device "B" is established, session history information stored in the server can be displayed on the device "B". Session history information may be transferred using SIP MESSAGE, SIP PUBLISH or other SIP messages.

Figure 3:
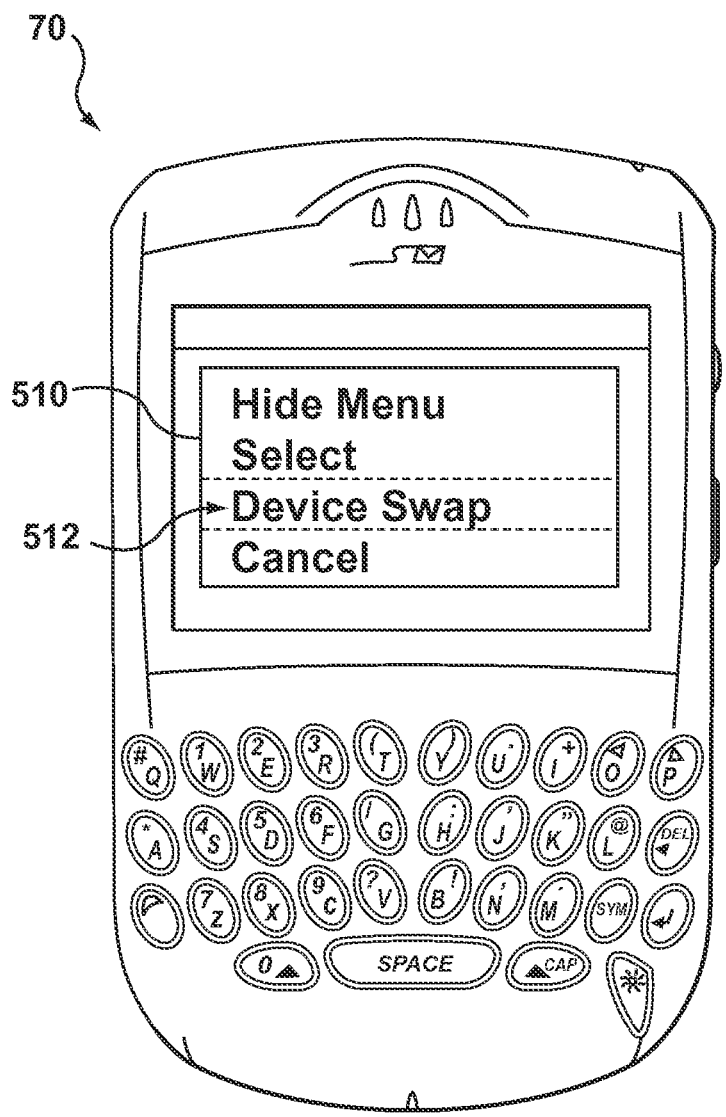
FIG. 3 shows an example interface for a device configured to enable device switching.

FIG. 3 illustrates an example menu 510 which the user may access during an active call. As can be seen, the user may select a "Device Swap" menu option 512 from the menu 510. The user can select "Device Swap" by any available method supported by the device 70 (e.g., via the keypad, track ball, roller wheel, touch screen, etc.). Regardless of how the user manipulates device "A", the device 70 will send the switch message 102 (FIG. 2A) to the server 30 requesting the device switch. As with all embodiments described herein, the server 30 may determine if the user has rights to initiate a device switch. For purposes of the illustrated example, it is presumed that the switch may occur. The "Device Swap" menu option may show each of the devices with human readable device names that the user recognizes. The devices may be identified by common names, such as "cell phone" or "personal digital assistant", or may be identified by user customized names, such as "Bill's cell" or "Mary's computer", or may be identified by icons or other graphical symbols. In one embodiment, the device addresses may be displayed. The user may be permitted to select from the menu a device to which the session can be swapped.

Scenario 100 is described as being initiated by the user of device "A". It should be appreciated that the device client operating on the remote device 70 could be configured to automatically detect that a device swap would be beneficial (e.g., low battery conditions, poor signal strength or quality of service, etc.). As such, when the predetermined condition(s) arise(s), e.g., when the battery level, signal strength or quality of service has dropped below a predetermined threshold(s), the device client could alert the user that a device swap would be beneficial by initiating an audible, vibrational and/or visual alert on the remote device 70. The alert could display a menu, such as menu 510 (FIG. 3) giving the user the chance to immediately request the device swap. In another embodiment, the device 70 could initiate the device switch automatically, without waiting for user interaction.

Figure 2B:
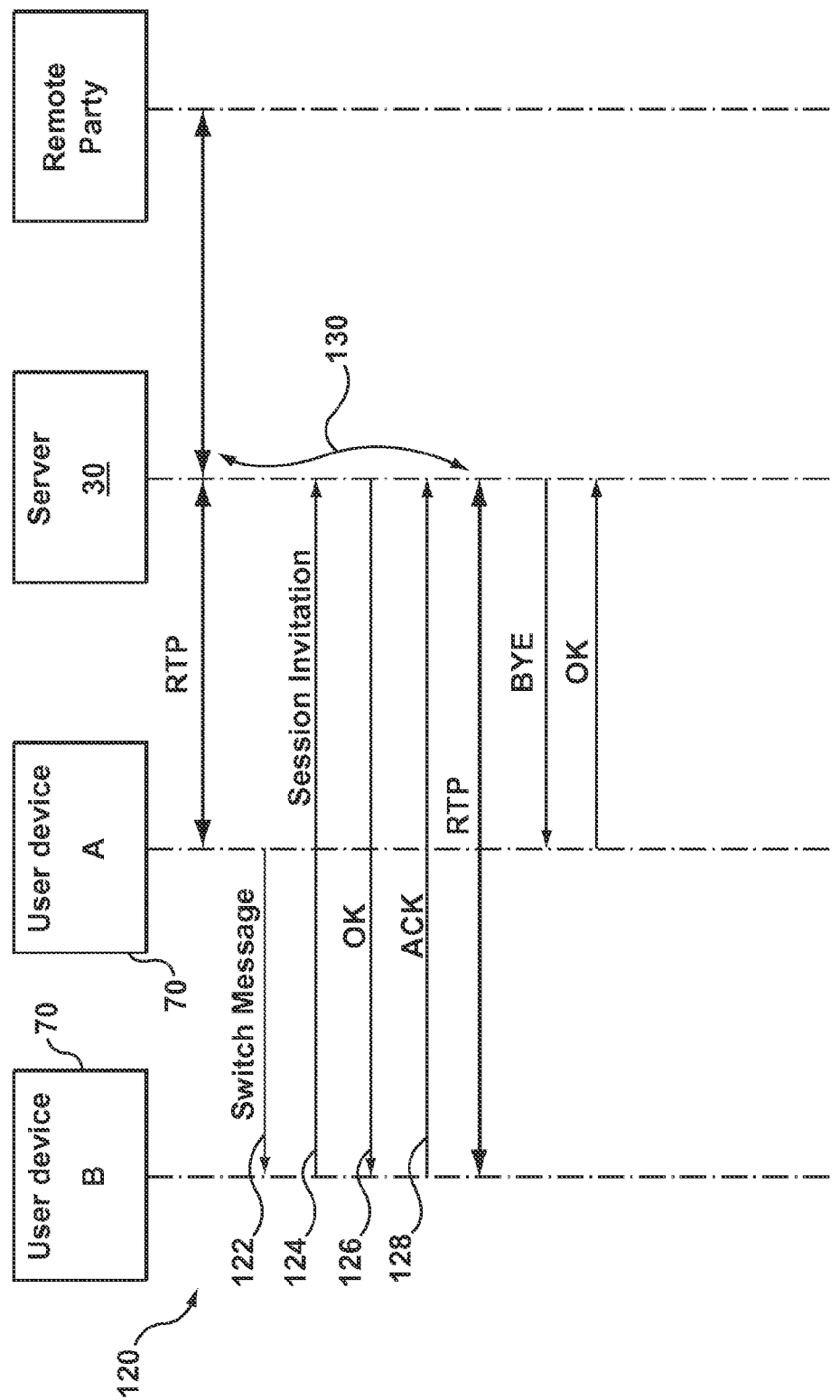
FIG. 2B shows another example flow diagram for executing a device switch during an active session.

FIG. 2B illustrates a scenario 120 in which the user of device A is participating in a session with a remote party and decides that a switch to device B is required. Both device "A" and device "B" are devices 70 associated with a user address. The association is stored in user preferences in the user data entity 36 at the server 30.

In scenario 120, the user of device A is engaged in a session with a remote party. Session data is carried over a first media leg, such as using RTP or MSRP, between user device "A" and the server 30, and over a second media leg between the server 30 and the remote party. The second media leg may be wholly or partly RTP or MSRP, although in some embodiments the remote party may be located within a legacy network and the session data may pass through interworking entities 14.

In the illustrated example, at some point during the session, the user determines that a switch to device "B" is required. In this embodiment, the user initiates a device swap on device "A" and device "A" sends a switch message 122 directly to device "B". The switch message 122 may be a SIP message or a non-SIP message. In one embodiment, the switch message 122 may be sent using a short-range communication link, such as infrared, Bluetooth, etc. In another embodiment, the switch message 122 is a SIP message addressed to device "B". The SIP message may be addressed to the GRUU of device "B". In one example embodiment, the SIP message is a REFER message containing the address of the server 30 in the Refer-to header.

In response to the switch message 122, the device "B" then sends a session invitation 124 to the server 30 whilst the ongoing session between device "A" and the server 30 remains active. The session invitation 124 may be SIP INVITE message. In some embodiments, the session invitation 122 may be a custom SIP INVITE message containing a "device swap" feature indicator detectable by the server 30. In one example embodiment, the SIP REFER message from device "A" also contains dialog information with regard to the existing dialog between device "A" and the server 30, and the SIP INVITE message from device "B" contains a Replaces header referencing the dialog. In other words, media data between the remote party and the server 30 is sent within the older dialog and media data from the device "B" is sent from server 30 to the remote party within the existing older dialog between server 30 and the remote party.

It will be appreciated that device "B" may send various SIP NOTIFY messages to device "A" in connection with the SIP REFER message, although they are not illustrated in FIG. 2B for clarity.

The server 30 then ends the dialog with device "A" by sending a SIP BYE request.

In another embodiment, the device switch may be initiated by device "B" without any information regarding the ongoing session on device "A". In this scenario, the device switch is initiated by the user selecting a "device swap" menu option on device "B". Device "B" then sends a device swap message or signal to the server 30. In one embodiment, the device swap message may be a custom SIP INVITE message. For example, the SIP INVITE message from device "B" to the server 30 may contain a feature indicator or some other indicia that the server 30 interprets as a "device swap" instruction. The server 30 then consults the user data entity 36 to determine the user address associated with device "B". Using the user information for the user address, the server 30 identifies other devices 70 associated with the same user address. The server 30 may then identify which device 70 has an active session, e.g. device "A", and deduces that the device switch relates to the session currently active on device "A". In this scenario, device "A" is unaware that the switch is about to occur and will have its session terminated by the server 30.

To prevent unauthorized "take-over" of a session, the server 30 may inform device "A" that a device swap request has been received, thereby permitting device "A" to inform the user, such as by a visual output notifying that a device swap request is pending. The user may then be given the opportunity to accept or reject the device swap on device "A". Device "A" may then communicate the acceptance/rejection to the server 30, which will react accordingly. The notification from the server 30 to device "A" may, in some cases, include identification of the device that has made the request, e.g. device "B". The identification may be a human readable device identifier, such as text (e.g. "cell phone", or "home personal computer"), or a suitable icon, similar to that used in the device swap menu described above.

Figure 4:
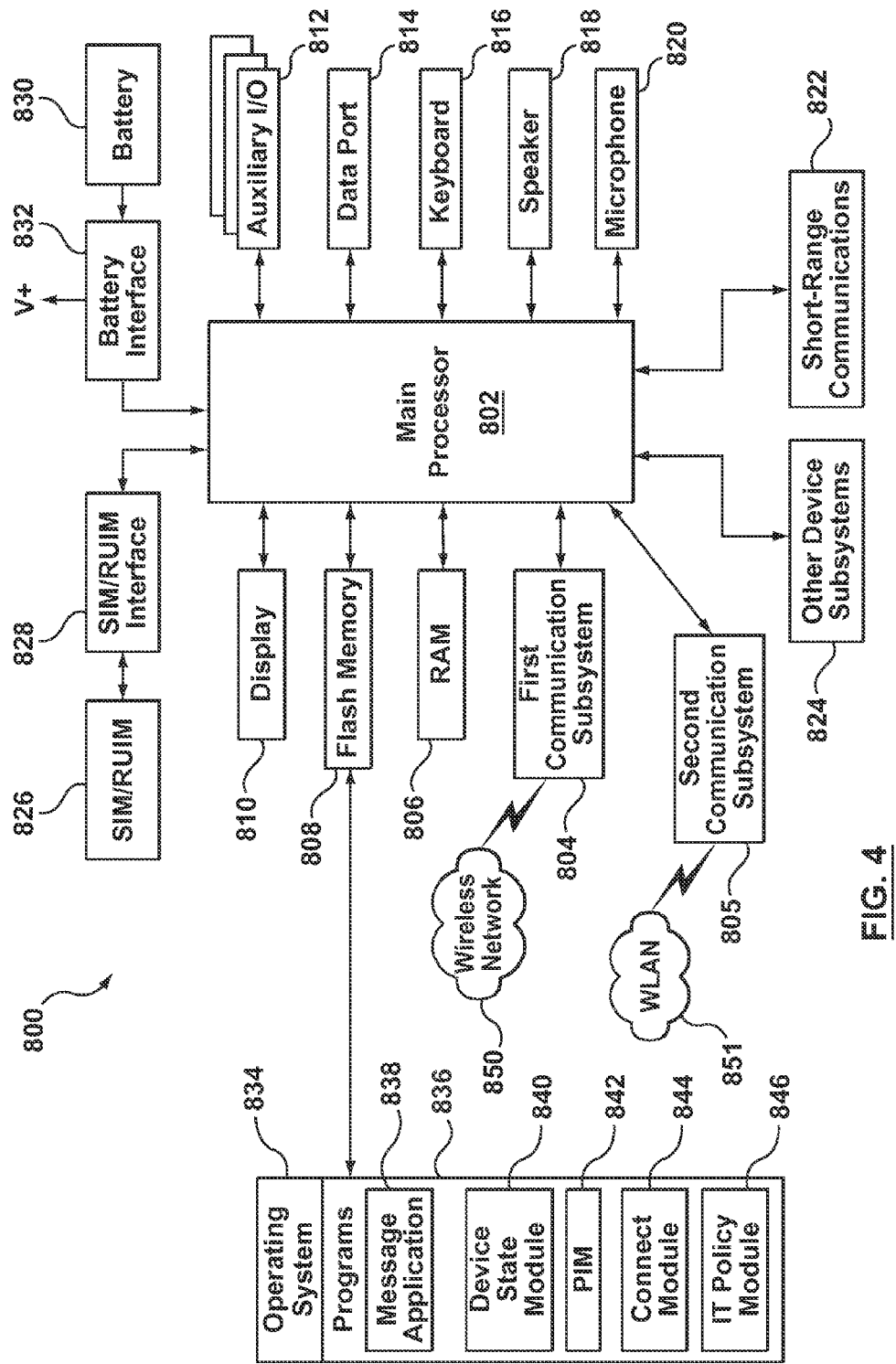
FIG. 4 is a block diagram of an exemplary mobile device constructed in accordance with an embodiment disclosed herein.

In one embodiment, the device 70 can be implemented as mobile device 800, as illustrated in FIG. 4. In an example embodiment, the mobile device 800 is adapted to communicate via both WLANs and WWANs. In one embodiment, the mobile device 800 is a wireless handset that operates in accordance with IEEE 802.11 standards and cellular network interface standards (e.g., GSM/GPRS). Mobile device 800 is a two-way communication device with advanced data communication capabilities including the capability to communicate with other mobile devices or computer systems through a network of transceiver stations. The mobile device has the capability to allow voice communications. Depending on the functionality provided by the mobile device, it may be referred to as a data messaging device, a two-way pager, a cellular telephone with data messaging capabilities, a wireless Internet appliance, or a data communication device (with or without telephony capabilities).

The mobile device 800 is adapted to wirelessly communicate with cellular networks (i.e., WWANs) 850 via a first communication subsystem 804 and wireless access points of a WLAN (e.g., WLAN 851) via a second communication subsystem 805. Although the device 800 may have (and/or may be shown to have) separate and independent subsystems 804, 805 for these purposes, it should be appreciated that at least some portions or components of these otherwise different subsystems 804, 805 maybe shared where possible. To aid the reader in understanding the structure of the mobile device 800 and how it communicates with other devices and host systems, reference will now be made to FIGS. 4 and 5.

Referring to FIG. 4, shown therein is a block diagram of an exemplary embodiment of a mobile device 800. The mobile device 800 includes a number of components such as a main processor 802 that controls the overall operation of the mobile device 800. Communication functions, including data and voice communications, are performed through a communication subsystem 804. The communication subsystem 804 receives messages from and sends messages to a first wireless network 850. In this exemplary embodiment of the mobile device 800, the communication subsystem 804 may be configured in accordance with the Global System for Mobile Communication (GSM), General Packet Radio Services (GPRS), Enhanced Data GSM Environment (EDGE), and/or Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 804 with the wireless network 850 represents one or more different Radio Frequency (RF) channels, operating according to defined protocols specified for GSM/GPRS/EDGE/UMTS communications. With newer network protocols, these channels are capable of supporting both circuit switched voice communications and packet switched data communications.

Although the wireless network 850 associated with mobile device 800 may be a GSM/GPRS/EDGE/UMTS wireless network in one exemplary implementation, other wireless networks may also be associated with the mobile device 800 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 802 also interacts with additional subsystems such as a Random Access Memory (RAM) 806, a flash memory 808, a display 810, an auxiliary input/output (I/O) subsystem 812, a data port 814, a keyboard 816, a speaker 818, a microphone 820, short-range communications 822 and other device subsystems 824.

Some of the subsystems of the mobile device 800 perform communication-related functions, whereas other subsystems may provide "resident" or on-device functions. By way of example, the display 810 and the keyboard 816 may be used for both communication-related functions, such as entering a text message for transmission over the network 850, and device-resident functions such as a calculator or task list.

The mobile device 800 can send and receive communication signals over the wireless network 850 after required network registration or activation procedures have been completed. Network access is associated with a subscriber or user of the mobile device 800. To identify a subscriber, the mobile device 800 requires a SIM/RUIM card 826 (i.e. Subscriber Identity Module or a Removable User Identity Module) to be inserted into a SIM/RUIM interface 828 in order to communicate with a network. The SIM card or RUIM 826 is one type of a conventional "smart card" that can be used to identify a subscriber of the mobile device 800 and to personalize the mobile device 800, among other things. Without the SIM card 826, the mobile device 800 is not fully operational for communication with the wireless network 850. By inserting the SIM card/RUIM 826 into the SIM/RUIM interface 828, a subscriber can access all subscribed services. Services may include: web browsing and messaging such as e-mail, voice-mail, Short Message Service (SMS), and Multimedia Messaging Services (MMS). More advanced services may include: point of sale, field service and sales force automation. The SIM card/RUIM 826 includes a processor and memory for storing information. Once the SIM card/RUIM 826 is inserted into the SIM/RUIM interface 828, it is coupled to the main processor 802. In order to identify the subscriber, the SIM card/RUIM 826 can include some user parameters such as an International Mobile Subscriber Identity (IMSI). An advantage of using the SIM card/RUIM 826 is that a subscriber is not necessarily bound by any single physical mobile device. The SIM card/RUIM 826 may store additional subscriber information for a mobile device as well, including datebook (or calendar) information and recent call information. Alternatively, user identification information can also be programmed into the flash memory 808.

The mobile device 800 is a battery-powered device and includes a battery interface 832 for receiving one or more rechargeable batteries 830. In at least some embodiments, the battery 830 can be a smart battery with an embedded microprocessor. The battery interface 832 is coupled to a regulator (not shown), which assists the battery 830 in providing power V+ to the mobile device 800. Although current technology makes use of a battery, future technologies such as micro fuel cells may provide the power to the mobile device 800.

The mobile device 800 also includes an operating system 834 and software components 836 to 846 which are described in more detail below. The operating system 834 and the software components 836 to 846 that are executed by the main processor 802 are typically stored in a persistent store such as the flash memory 808, which may alternatively be a read-only memory (ROM) or similar storage element (not shown). Those skilled in the art will appreciate that portions of the operating system 834 and the software components 836 to 846, such as specific device applications, or parts thereof, may be temporarily loaded into a volatile store such as the RAM 806. Other software components can also be included, as is well known to those skilled in the art.

The subset of software applications 836 that control basic device operations, including data and voice communication applications, will normally be installed on the mobile device 800 during its manufacture. Other software applications include a message application 838 that can be any suitable software program that allows a user of the mobile device 800 to send and receive electronic messages. Various alternatives exist for the message application 838 as is well known to those skilled in the art. Messages that have been sent or received by the user are typically stored in the flash memory 808 of the mobile device 800 or some other suitable storage element in the mobile device 800. In at least some embodiments, some of the sent and received messages may be stored remotely from the device 800 such as in a data store of an associated host system that the mobile device 800 communicates with.

The software applications can further include a device state module 840, a Personal Information Manager (PIM) 842, and other suitable modules (not shown). The device state module 840 provides persistence, i.e. the device state module 840 ensures that important device data is stored in persistent memory, such as the flash memory 808, so that the data is not lost when the mobile device 800 is turned off or loses power.

The PIM 842 includes functionality for organizing and managing data items of interest to the user, such as, but not limited to, e-mail, contacts, calendar events, voicemails, appointments, and task items. A PIM application has the ability to send and receive data items via the wireless network 850. PIM data items may be seamlessly integrated, synchronized, and updated via the wireless network 850 with the mobile device subscriber's corresponding data items stored and/or associated with a host computer system. This functionality creates a mirrored host computer on the mobile device 800 with respect to such items. This can be particularly advantageous when the host computer system is the mobile device subscriber's office computer system.

The mobile device 800 also includes a connect module 844, and an IT policy module 846. The connect module 844 implements the communication protocols that are required for the mobile device 800 to communicate with the wireless infrastructure and any host system, such as an enterprise system, that the mobile device 800 is authorized to interface with.

The connect module 844 includes a set of APIs that can be integrated with the mobile device 800 to allow the mobile device 800 to use any number of services associated with the enterprise system. The connect module 844 allows the mobile device 800 to establish an end-to-end secure, authenticated communication pipe with the host system. A subset of applications for which access is provided by the connect module 844 can be used to pass IT policy commands from the host system to the mobile device 800. This can be done in a wireless or wired manner. These instructions can then be passed to the IT policy module 846 to modify the configuration of the device 800. Alternatively, in some cases, the IT policy update can also be done over a wired connection.

The IT policy module 846 receives IT policy data that encodes the IT policy. The IT policy module 846 then ensures that the IT policy data is authenticated by the mobile device 800. The IT policy data can then be stored in the flash memory 806 in its native form. After the IT policy data is stored, a global notification can be sent by the IT policy module 846 to all of the applications residing on the mobile device 800. Applications for which the IT policy may be applicable then respond by reading the IT policy data to look for IT policy rules that are applicable.

The IT policy module 846 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 846 can determine which applications are affected by the IT policy data and send a notification to only those applications.

In either of these cases, for applications that aren't running at the time of the notification, the applications can call the parser or the IT policy module 846 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 846 sends an acknowledgement back to the host system to indicate that the IT policy data was received and successfully applied.

Other types of software applications can also be installed on the mobile device 800. These software applications can be third party applications, which are added after the manufacture of the mobile device 800. Examples of third party applications include games, calculators, utilities, etc.

The additional applications can be loaded onto the mobile device 800 through at least one of the wireless network 850, the auxiliary I/O subsystem 812, the data port 814, the short-range communications subsystem 822, or any other suitable device subsystem 824. This flexibility in application installation increases the functionality of the mobile device 800 and may provide enhanced on-device functions, communication-related functions, or both. For example, secure communication applications may enable electronic commerce functions and other such financial transactions to be performed using the mobile device 800.

The data port 814 enables a subscriber to set preferences through an external device or software application and extends the capabilities of the mobile device 800 by providing for information or software downloads to the mobile device 800 other than through a wireless communication network. The alternate download path may, for example, be used to load an encryption key onto the mobile device 800 through a direct and thus reliable and trusted connection to provide secure device communication.

The data port 814 can be any suitable port that enables data communication between the mobile device 800 and another computing device. The data port 814 can be a serial or a parallel port. In some instances, the data port 814 can be a USB port that includes data lines for data transfer and a supply line that can provide a charging current to charge the battery 830 of the mobile device 800.

The short-range communications subsystem 822 provides for communication between the mobile device 800 and different systems or devices, without the use of the wireless network 850. For example, the subsystem 822 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 804 and input to the main processor 802. The main processor 802 will then process the received signal for output to the display 810 or alternatively to the auxiliary I/O subsystem 812. A subscriber may also compose data items, such as e-mail messages, for example, using the keyboard 816 in conjunction with the display 810 and possibly the auxiliary I/O subsystem 812. The auxiliary subsystem 812 may include devices such as: a touch screen, mouse, track ball, infrared fingerprint detector, or a roller wheel with dynamic button pressing capability. The keyboard 816 is preferably an alphanumeric keyboard and/or telephone-type keypad. However, other types of keyboards may also be used. A composed item may be transmitted over the wireless network 850 through the communication subsystem 804.

For voice communications, the overall operation of the mobile device 800 is substantially similar, except that the received signals are output to the speaker 818, and signals for transmission are generated by the microphone 820. Alternative voice or audio I/O subsystems, such as a voice message recording subsystem, can also be implemented on the mobile device 800. Although voice or audio signal output is accomplished primarily through the speaker 818, the display 810 can also be used to provide additional information such as the identity of a calling party, duration of a voice call, or other voice call related information.

Figure 5:
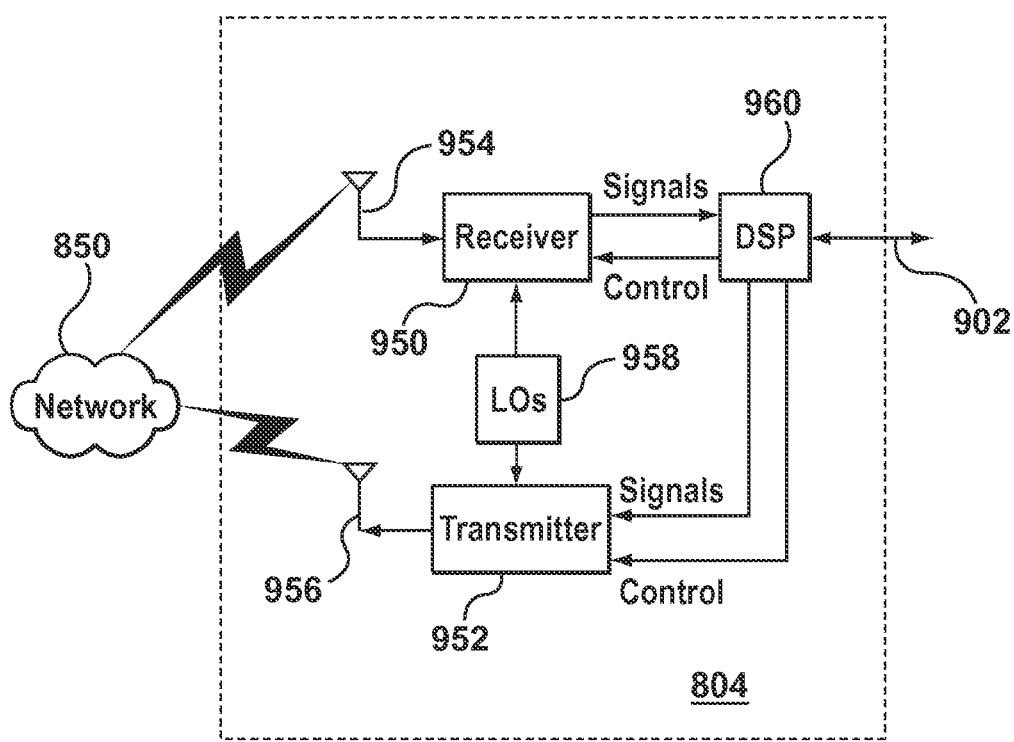
FIG. 5 is a block diagram of an exemplary communication subsystem component of the mobile device in accordance with an embodiment disclosed herein.

Referring to FIG. 5, an exemplary block diagram of the communication subsystem component 804 is shown. The communication subsystem 804 includes a receiver 950, a transmitter 952, as well as associated components such as one or more embedded or internal antenna elements 954 and 956, Local Oscillators (LOs) 958, and a processing module such as a Digital Signal Processor (DSP) 960. The particular design of the communication subsystem 804 is dependent upon the communication network 850 with which the mobile device 800 is intended to operate. Thus, it should be understood that the design illustrated in FIG. 9 serves only as one example.

Signals received by the antenna 954 through the wireless network 850 are input to the receiver 950, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 960. In a similar manner, signals to be transmitted are processed, including modulation and encoding, by the DSP 960. These DSP-processed signals are input to the transmitter 952 for digital-to-analog (D/A) conversion, frequency up conversion, filtering, amplification and transmission over the wireless network 850 via the antenna 956. The DSP 960 not only processes communication signals, but also provides for receiver and transmitter control. For example, the gains applied to communication signals in the receiver 950 and the transmitter 952 may be adaptively controlled through automatic gain control algorithms implemented in the DSP 960.

The wireless link between the mobile device 800 and the wireless network 850 can contain one or more different channels, typically different RF channels, and associated protocols used between the mobile device 800 and the wireless network 850. An RF channel is a limited resource that must be conserved, typically due to limits in overall bandwidth and limited battery power of the mobile device 800.

When the mobile device 800 is fully operational, the transmitter 952 is typically keyed or turned on only when it is transmitting to the wireless network 850 and is otherwise turned off to conserve resources. Similarly, the receiver 950 is periodically turned off to conserve power until it is needed to receive signals or information (if at all) during designated time periods.

The second subsystem 805, which is utilized for wireless communications via wireless access points of a WLAN 851, is structurally similar to that shown and described for the first subsystem 804. However, a baseband and media access control (MAC) processing module replaces the DSP 960. As stated previously, in one embodiment, the second subsystem 805 is adapted to operate in accordance with well-known IEEE 802.11 standards.

What is claimed is:

1. A method of facilitating transfer of an existing session from a first user device to a second user device, the method comprising:

the existing session being established between the first user device and a remote party and the existing session including a first leg between the first user device and a server and a second leg between the server and the remote party, the server storing a first association between a user address and the first user device and a second association between the user address and the second user device, the user address comprising a Session Initiation Protocol (SIP) Uniform Resource Identifier (URI), the first user device having a first Globally Routable User Agent URI (GRUU) based on the SIP URI, and the second user device having a second GRUU based on the SIP URI;

receiving, at the server, a session invitation message from the second user device containing a reference to the existing session with an instruction to replace the first user device;

verifying from the stored first and second associations that the GRUU of the second user device is based on a same SIP URI as that included in the user address associated with the first user device, said verifying performed by the server without further communication with the remote party;

accepting the session invitation message from the second user device to establish a new leg between the second user device and the server;

joining the new leg with the second leg of the existing session to enable an exchange of media between the second user device and the remote party; and terminating the first leg of the existing session.

2. The method claimed in claim 1, wherein the reference to the existing session comprises a dialog ID for the first leg of the existing session.

3. The method claimed in claim 1, wherein the first user device is registered with one or more SIP registrars for GRUU information associated with the user address.

4. The method claimed in claim 3, wherein session invitation message is received from the second using device after a device switch message from the first user device is received at the second user device, the device switch message including information identifying the existing session and being addressed to the second user device using the second GRUU.

5. The method claimed in claim 4, wherein the reference to the existing session comprises a dialog ID for the first leg of the existing session.

6. The method claimed in claim 5, wherein the device switch message comprises a SIP REFER message referencing the server, and wherein the session invitation message comprises a SIP INVITE message containing a Replaces header.

7. The method claimed in claim 4, wherein the device switch message comprises a SIP REFER message referencing the server, and wherein the session invitation message comprises a SIP INVITE message containing a Replaces header.

8. The method claimed in claim 1, wherein session invitation message is received from the second using device after a device switch message from the first user device is received at the second user device, the device switch message including information identifying the existing session and being addressed to the second user device using the second GRUU.

9. The method claimed in claim 8, wherein the device switch message comprises a SIP REFER message referencing the server, and wherein the session invitation message comprises a SIP INVITE message containing a Replaces header.

10. A system for facilitating transfer of an existing session from a first user device to a second user device, the system comprising:
the first user device;
the second user device;
and the server;
wherein the existing session is established between the first user device and a remote party and wherein the existing session includes a first leg between the first user device and a server and a second leg between the server and the remote party, wherein the first user device and the second user device are each associated with a user address and the user address comprises a Session Initial Protocol (SIP) Uniform Resource Identifier (URI), wherein the first user device has a first Globally Routable User Agent URI (GRUU) based on the SIP URI, and wherein the second user device has a second GRUU based on the SIP URI;
wherein the first user device is configured to send a device switch message to the second user device using the second GRUU, and wherein the device switch message includes information identifying the existing session;
and wherein the server comprises:
an IP communications interface for sending and receiving IP-based communications over a network;
a user data entity containing user information including a first association between the user address and the first user device, and a second association between the user address and the second user device; and
a control subsystem for controlling sessions, the control subsystem including a device swap component configured to:
receive from the second user device a session invitation message containing a reference to the existing session with an instruction to replace the first user device,
verify from the first and second associations that the GRUU of the second user device is based on a same SIP URI as that included in the user address associated with the first user device, said verifying performed by the server without further communication with the remote party,
accept the session invitation message from the second user device to establish a new leg between the second user device and the server,
join the new leg with the second leg of the existing session to enable an exchange of media between the second user device and the remote party, and
terminate the first leg of the existing session.

11. The system claimed in claim 10, wherein the reference to the existing session comprises a dialog ID for the first leg of the existing session.

12. The system claimed in claim 11, wherein the device switch message comprises a SIP REFER message referencing the server, and wherein the session invitation message comprises a SIP INVITE message containing a Replaces header.

13. The system claimed in claim 10, wherein the device switch message comprises a SIP REFER message referencing the server, and wherein the session invitation message comprises a SIP INVITE message containing a Replaces header.

14. The system claimed in claim 10, wherein the first user device is further configured to register with one or more SIP registrars for GRUU information associated with the user address and to receive from the one or more SIP registrars the second GRUU.

15. The system claimed in claim 14, wherein the reference to the existing session comprises a dialog ID for the first leg of the existing session.

16. The system claimed in claim 14, wherein the device switch message comprises a SIP REFER message referencing the server, and wherein the session invitation message comprises a SIP INVITE message containing a Replaces header.

17. A server for facilitating transfer of an existing session from a first user device to a second user device, the server comprising:
an IP communications interface for sending and receiving IP-based communications over a network;
a user data entity containing user information including a first association between the user address and the first user device, and a second association between the user address and the second user device; and
a control subsystem for controlling sessions;
wherein the existing session is established between the first user device and a remote party and wherein the existing session includes a first leg between the first user device and a server and a second leg between the server and the remote party, wherein the first user device and the second user device are each associated with a user address and the user address comprises a Session Initiation Protocol (SIP) Uniform Resource Identifier (URI), wherein the first user device has a first Globally Routable User Agent URI (GRUU) based on the SIP URI, and wherein the second user device has a second GRUU based on the SIP URI; and
wherein the control subsystem includes a device swap component configured to:
receive from the second user device a session invitation message containing a reference to the existing session with an instruction to replace the first user device;
verify from the stored association that the GRUU of the second user device is based on a same SIP URI as that included in the user address associated with the first user device, said verifying performed by the server without further communication with the remote party;
accept the session invitation message from the second user device to establish a new leg between the second user device and the server;
join the new leg with the second leg of the existing session to enable an exchange of media between the second user device and the remote party; and
terminate the first leg of the existing session.

18. The server claimed in claim 17, wherein the reference to the existing session comprises a dialog ID for the first leg of the existing session.

19. The server claimed in claim 17, wherein the first user device is registered with one or more SIP registrars for GRUU information associated with the user address.

20. The server claimed in claim 17, wherein the session invitation message is received from the second using device after a device switch message from the first user device is received at the second user device, the device switch message including information identifying the existing session and being addressed to the second user device using the second GRUU.

\* \* \* \* \*